United States Patent

[11] 3,618,747

[72] Inventor Clifton E. Hammond
 Gering, Nebr.
[21] Appl. No. 846,890
[22] Filed Aug. 1, 1969
[45] Patented Nov. 9, 1971
[73] Assignee Lockwood Corporation
 Gering, Nebr.

[54] CONVEYOR CHAIN LINK WITH YIELDABLE
 CONTACT SURFACE
 10 Claims, 5 Drawing Figs.
[52] U.S. Cl. ............................................. 198/195
[51] Int. Cl. ........................................... B65g 15/52
[50] Field of Search .............................. 198/195,
 193, 189, 197, 184

[56] References Cited
 UNITED STATES PATENTS
 3,339,712 9/1967 Anderson ................. 198/195

FOREIGN PATENTS
94,953 7/1960 Netherlands ................. 198/195

Primary Examiner—Gerald M. Forlenza
Assistant Examiner—George F. Abraham
Attorney—McGrew and Edwards ABSTRACT: A link member for chain conveyor assemblies having a U-shaped portion at each end for connection with a similar link of the chain, and a bridging member connecting the U-shaped end portions and extending through a bore of a yieldable body of oblong section in friction fit with the bordering surface of said bore. The body has a second bore which may be an opening through its lengthwise extent, or tapered and open at only one end, or at least partially filled with cellular rubber. SAid second bore provides increased yieldability in the body material adjoining the bore which has a cushioning effect in contacting produce being moved by the conveyor.

PATENTED NOV 9 1971 3,618,747

INVENTOR.
Clifton E. Hammond
BY
ATTORNEYS

CONVEYOR CHAIN LINK WITH YIELDABLE CONTACT SURFACE

This invention relates to link construction utilized in forming the chain of an endless chain link conveyor.

Chain link conveyors are widely used in produce harvesting equipment and produce processing equipment, frequently involving the location of conveyor stretches at inclinations causing rather fast gravitational movement of material being conveyed, which in the case of certain types of produce results in bruising with damaging results. It has been known to cover the links of a chain link conveyor with a rubber sleeve or cover as shown and described in Crawford U.S. Pat. No. 2,244,827, for example.

However, the sleeve-type link is a relatively stiff object and the yieldability of the cover portion is limited to a degree which only slightly lessens the stiffness of the link surface. Consequently, any appreciable or substantial force directed against the surface of produce on impact with such a member results in bruising to an unsatisfactory degree.

The practice of my invention provides several innovations in the use of chain link members for conveying produce on inclined courses which overcome the defects of the usual sleeve-type cover. A highly advantageous result is obtained by the provision of multiple bores in the cover member so as to establish areas of varying density within the cover body and increasing yieldability by such arrangement. This may be done in conjunction with the placement of the area of lowest density as the impact-reducing contact surface of the link, while one bore admits the bridging portion of the link and establishes higher density.

Another innovation is the formation of a bore in the body which is partially or almost completely filled with a rubber or rubberlike insert of cellular structure which is of substantially less density than the remaining material of the body. In a preferred arrangement, the two bores will extend lengthwise through the body in substantially parallel arrangement with the low-density portion disposed outwardly beyond the normal conveyor surface and functions as a contact surface.

Accordingly, it is an object of my invention to provide a simple, durable and efficient cover member for conveyor chain links having a plurality of bores formed in the cover body for establishing varying densities in the body permitting contact surfaces thereof to be of lowest density and highest yieldability.

Another object of my invention is to provide a simple, durable and efficient link assembly for chain conveyors that is arranged for moving or arresting movement of tender produce on the conveyor without bruising the produce.

Still another object of my invention is to provide a cover for the bridging portion of a conveyor chain link which has a plurality of bores, one of which receives the bridging portion, and at least one other bore increases yieldability in other portions of the cover body.

Other objects reside in novel combinations and arrangements of parts and novel details of construction which will be described in the course of the following description.

The practice of my invention will be described with reference to the accompanying drawings illustrating typical embodiments using features of my invention. In the drawings, in the several views of which like parts bear similar reference numerals, FIG. 1 is a fragmentary side elevation of a driven end of a chain link conveyor with only a part of the links shown in full lines and dash lines representing the courses of conveyor movement;

Figure 1:
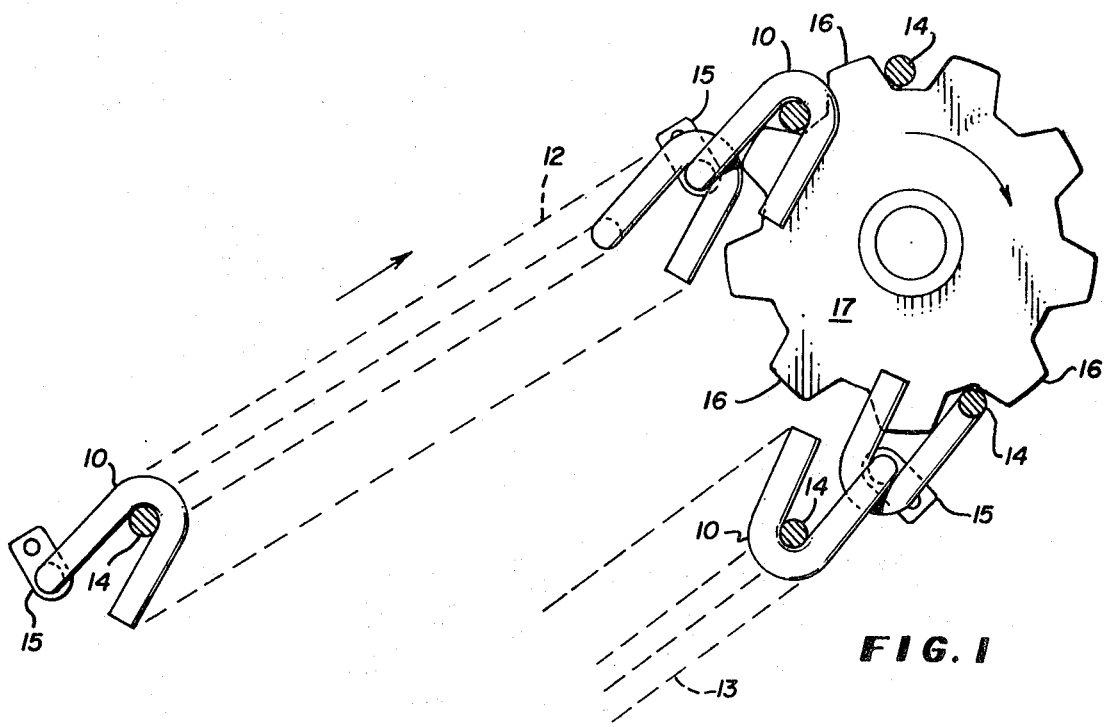
Figure 2:
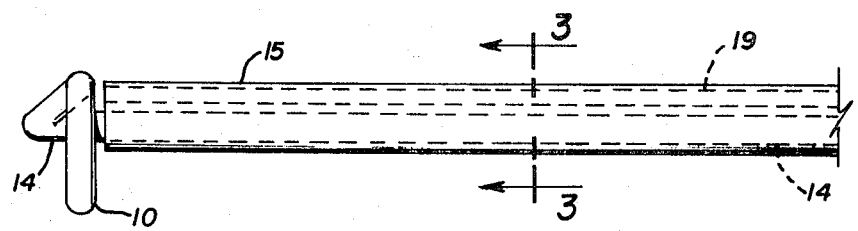
FIG. 2 is a fragmentary top plan view of one of the covered chain links of the type shown in FIG. 1 and embodying novel features of my invention.

As shown in FIG. 1 in fragmentary arrangement, a series of chains 10 of the conveyor assembly are arranged in what is known in the trade as a "hooks down" arrangement which refers to the position of the end hooks of the chain links in the position assumed in the upward conveying stretch indicated by the dash lines 12 as an ascending conveyor stretch, while the lower stretch 13 is a return stretch in this arrangement. It is the intention of this invention that the hook orientation may be either "hooks up" or "hooks down." As will be best understood by reference to FIG. 2, the conveyor links, in addition to the U-shaped end portions 10, have such portions interconnected by a bridging portion 14 which extends the full width of the conveying surface and has a yieldable cover member 15 of novel-type supported by the bridging portion in friction fit relation with another portion upstanding in relation to the conveying surface.

In the past, yieldable material has been used as a component of the conveyor chain assembly. In one form, rod stock similar to the rod stock shown in the present drawings has had its bridging portion encased by a sleeve member of resilient material for the purpose of reducing bruising of produce contacted in the conveyor movement. Rubber belting and similar material has been formed as a flap for insertion between the chain links of a chain conveyor and used to arrest movement of produce and thus avoid excessive bruising. However, both types of material have lacked the degree of elasticity or yieldability to function effectively in moving produce or arresting produce movement without bruising.

The yieldable cover member 15 of this invention may include different structural embodiments, all of which provide a body of varying density with the highest density portion surrounding the bridging portion of a chain link and the portion of the body extending away from the higher density area being of substantially lesser density. In mounting the body on the bridging support, the portion of greatest yieldability is disposed in an extended position beyond the normal conveying surface so as to be capable of arresting movement of produce tending to roll on the conveyor. This feature has been shown in FIG. 1 in which the cover portions 15 are so disposed relative to the normal conveyor surface as represented by the dash line 12.

In such arrangement, the links have the ends of bridging portion 14 engaging teeth 16 of a sprocket wheel 17 and the sprocket 17 at one end of the endless chain arrangement is a driven sprocket imparting the rotational movement to the endless conveyor assembly. The cover 15, as will be best understood by reference to FIGS. 2 and 3, comprises a body of oblong shape, the length of which corresponds generally with the bridging portion of the link on which it is carried. Preferably, the body is of uniform cross section having a plurality of lengthwise extending bores 18 and 19. The bore 18 usually is of larger diameter than the bore 19 but may be any suitable size and is formed by molding cover 15 on the bridging portion of link 14 which permits the outer or extended edge of the body to be positioned in a desired relation relative to the conveying surface of the assembly.

Figures 3, 4, 5:
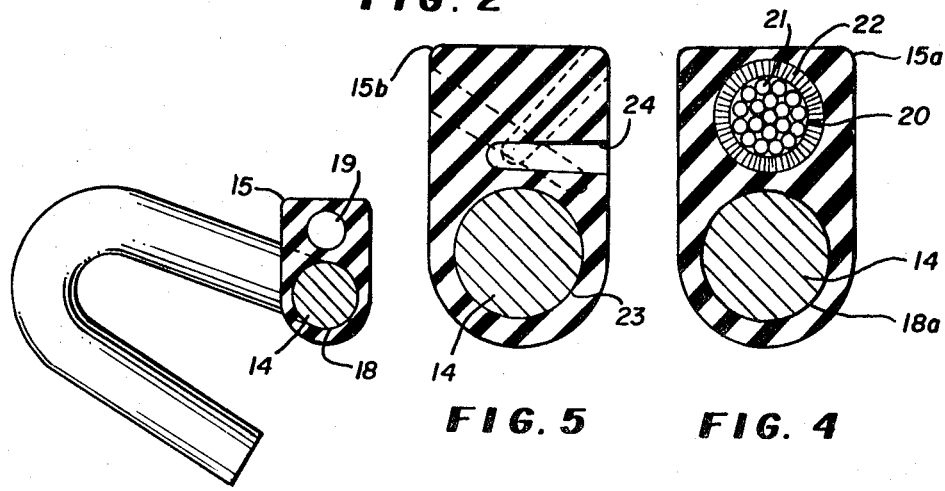
FIG. 3 is an enlarged section taken along the line 3—3, FIG. 2.
FIG. 4 is another enlarged sectional view of another type of cover member embodying features of my invention.
FIG. 5 is another enlarged section similar to FIG. 4 showing another type of cover member embodying features of my invention.

In the form shown in FIG. 3, bore 19 extends throughout the entire extent of body 15 and is open ended. This arrangement permits use of stronger rubber in fastening area and the hole allows sidewalls to flex when forces are directed against the outer end, giving it the effect of soft rubber.

FIG. 4 illustrates another form of plural bore assembly in which the upper bore is formed with a filling of small cells in integral relation. Such bores are normally formed by a molding rod which remains in place through a desired time interval of the curing operation. I have determined that by an early removal of the molding rod, I can obtain a desired cellular construction. As an example, if the total molding time is 14 minutes, for example, withdrawal of the rod after 8 minutes of such treatment will produce a cellular formation in the bore of the desired character. The material so treated may be natural rubber or synthetic rubber and the cellular portion has a different bulk density than the remaining portion of the body. It can withstand all of the required impact effect without deterioration or damage and has a long life in such use.

As shown in FIG. 4, the body 15a of this form has a lower bore 18a in which the bridging portion of chain link 14 is disposed in a molded fit and a second bore 20 also extends throughout body 15a. The cellular formation is shown at 21 in FIG. 4 and a bordering area 22 is also shown which also is of lower density because some of the material initially occupying this area has been withdrawn and used in the cell formation action.

Still another arrangement has been illustrated in FIG. 5 in which body 15b is shaped similarly to body 15 and has a lower bore 23 in which the bridging portion of the chain link 14 is disposed in molded fit. A series of small bores or openings 24, preferably tapering lengthwise, are disposed in sequential or random arrangement along the length of body 15b in varying angular position relative to the sides of said body. This forms an outer structure generally similar in effect to the cellular structure of FIG. 4 and establishes an area of relatively low density as compared with the high density portion bordering bore 18a.

I claim:

1. A resilient cover member for the portion of a chain link bridging the space between the sides of a chain-type endless conveyor, which comprises a body of yieldable material having spaced bores, at least one said bore extending throughout substantially the lengthwise extent of the body, and having a diameter adapted to receive such a chain link bridging portion in a molded fit, and at least one other bore than said first mentioned bore containing material of different bulk density than the remainder of the body and providing increased yieldability in the material of the body bordering such bore.

2. A cover member as defined in claim 1, in which the other bore than said first-mentioned bore contains yieldable material in cellular arrangement and a portion of the body bordering the cellular arrangement is of lower bulk density than the remainder of the body.

3. A cover member as defined in claim 1, in which the bores are substantially parallel throughout their lengthwise extent.

4. A cover member as defined in claim 1, in which one bore includes yieldable material in cellular arrangement.

5. A cover member as defined in claim 1, in which one bore is substantially filled with cellular rubber.

6. A cover member as defined in claim 1, in which the body is of substantially uniform section.

7. The combination with a bridging portion of a chain link extending between spaced end connectors of endless conveyor assemblies, of a cover member carried by said bridging portion comprising a body of yieldable material having spaced bores, at least one said bore extending throughout substantially the lengthwise extent of the body and having a diameter admitting such a bridging portion in a molded fit, and at least one other said bore defined by an area of increased yieldability in the portion of the body bordering such bore and containing material of different bulk density than the remainder of the body.

8. A combination as defined in claim 7, in which the yieldable material is natural rubber.

9. A combination as defined in claim 7, in which the yieldable material is synthetic rubber.

10. A combination as defined in claim 7, in which the yieldable material is moldable plastic.

* * * * *